(12) United States Patent
Tikkanen et al.

(10) Patent No.: US 6,691,131 B2
(45) Date of Patent: Feb. 10, 2004

(54) FUNCTIONAL MEMORY BASED ON A TRIE STRUCTURE

(75) Inventors: Matti Tikkanen, Espoo (FI); Jukka-Pekka Ilvonen, Helsinki (FI)

(73) Assignee: Nokia Corporation, Espoo (FI)

( * ) Notice: Subject to any disclaimer, the term of this patent is extended or adjusted under 35 U.S.C. 154(b) by 250 days.

(21) Appl. No.: 09/994,034

(22) Filed: Nov. 23, 2001

(65) Prior Publication Data

US 2002/0035660 A1 Mar. 21, 2002

Related U.S. Application Data

(63) Continuation of application No. PCT/FI00/00380, filed on Apr. 28, 2000.

(30) Foreign Application Priority Data

Jun. 2, 1999 (FI) .................................................. 991261

(51) Int. Cl.$^7$ ............................................... G06F 17/30
(52) U.S. Cl. ................................ 707/102; 707/4; 707/3
(58) Field of Search .............................. 707/1–10, 204, 707/100, 102, 202, 205, 104.1; 711/3, 128, 220, 221, 171, 153

(56) References Cited

U.S. PATENT DOCUMENTS

| 4,864,497 A | * | 9/1989 | Lowry et al. ............... 707/102 |
| 5,276,868 A | | 1/1994 | Poole ........................... 707/3 |
| 5,333,317 A | * | 7/1994 | Dann ........................... 707/5 |
| 5,592,667 A | | 1/1997 | Bugajski ..................... 707/102 |
| 5,684,976 A | * | 11/1997 | Soheili-Arasi et al. ...... 711/128 |
| 5,721,899 A | | 2/1998 | Namba ......................... 707/3 |
| 5,848,416 A | | 12/1998 | Tikkanen ................... 707/101 |
| 6,098,066 A | * | 8/2000 | Snow et al. ................... 707/3 |
| 6,185,550 B1 | * | 2/2001 | Snow et al. .................. 707/1 |
| 6,341,325 B2 | * | 1/2002 | Franaszek et al. ............. 711/3 |
| 6,360,227 B1 | * | 3/2002 | Aggarwal et al. .......... 707/102 |
| 6,453,325 B1 | * | 9/2002 | Cabrera et al. ............. 707/204 |

FOREIGN PATENT DOCUMENTS

| EP | 0408188 A2 | 1/1991 | ......... G06F/15/419 |
| FI | 991261 | 3/2000 | ............ G06F/17/30 |
| WO | WO 98/41932 | 9/1998 | ............ G06F/17/30 |
| WO | WO 98/41933 | 9/1998 | ............ G06F/17/30 |
| WO | WO 00/22550 | 4/2000 | ............ G06F/17/30 |

* cited by examiner

*Primary Examiner*—Charles Rones
*Assistant Examiner*—Neveen Abel Jalil
(74) *Attorney, Agent, or Firm*—Squire, Sanders & Dempsey L.L.P.

(57) ABSTRACT

The invention relates to a method for implementing a functional memory and to a memory arrangement. The memory is implemented as a directory structure comprising a tree-shaped hierarchy having nodes at several different hierarchy levels. In the directory structure, pointers are first added to nodes whose table contains a given first number of elements and which are width-compressed nodes. To maximize the performance of the functional trie structure, addition of a pointer to an individual width-compressed node is permitted until the number of pointers in the node corresponds to a given predetermined threshold value that is smaller than said first number. The width-compressed node is converted to a cluster of nodes made up by a parent node (N50) and separate child nodes (N51 . . . N54) as soon as the number of pointers to be accommodated in the width-compressed node exceeds said threshold value.

10 Claims, 4 Drawing Sheets

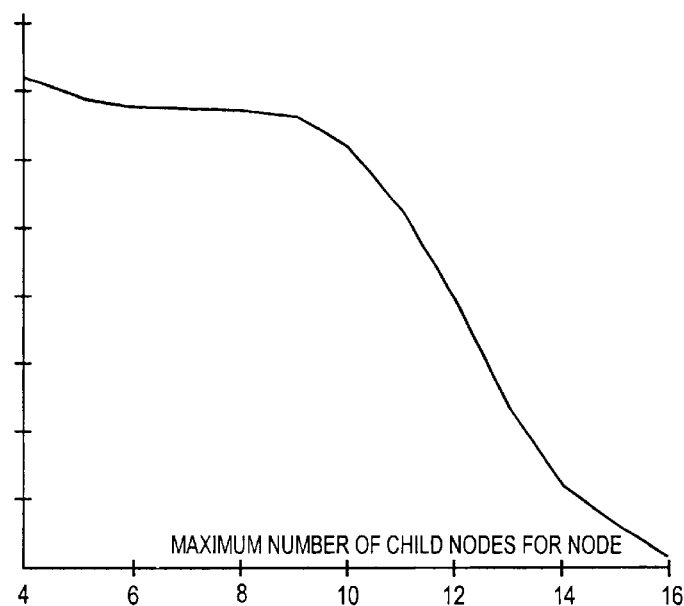
FIG. 7
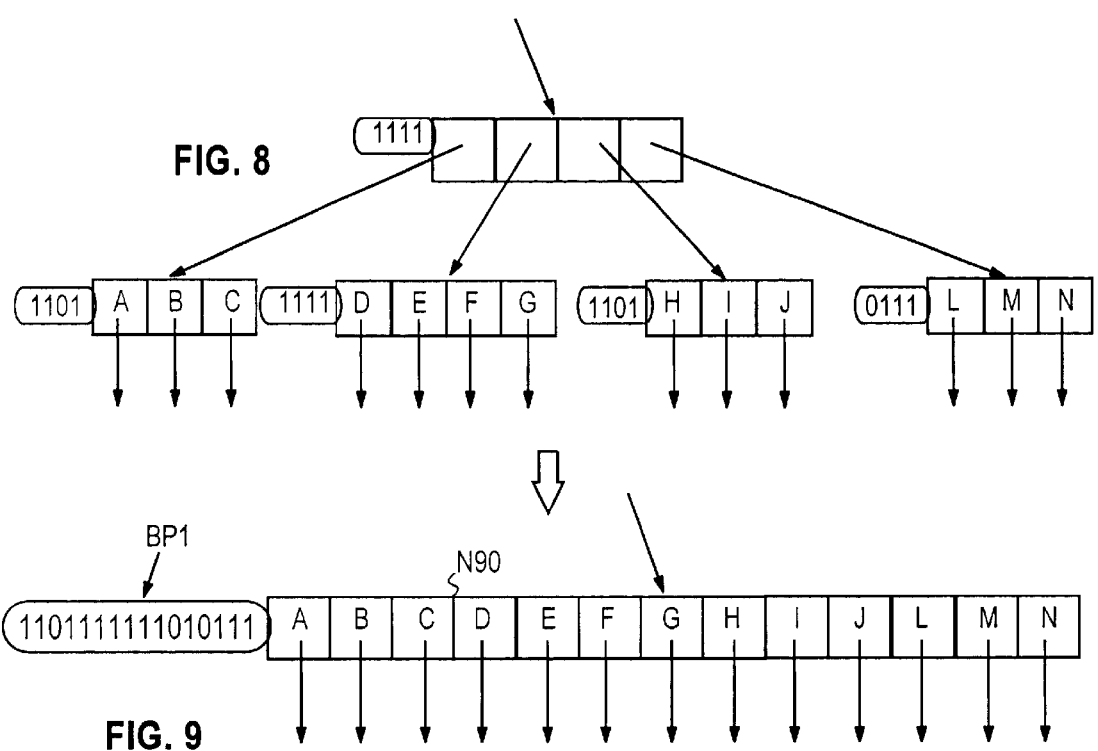
FIG. 8
FIG. 9

FIG. 10
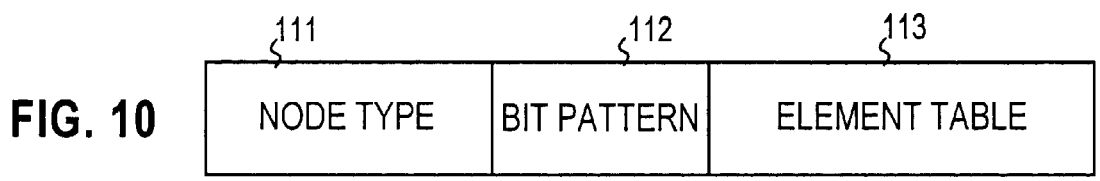
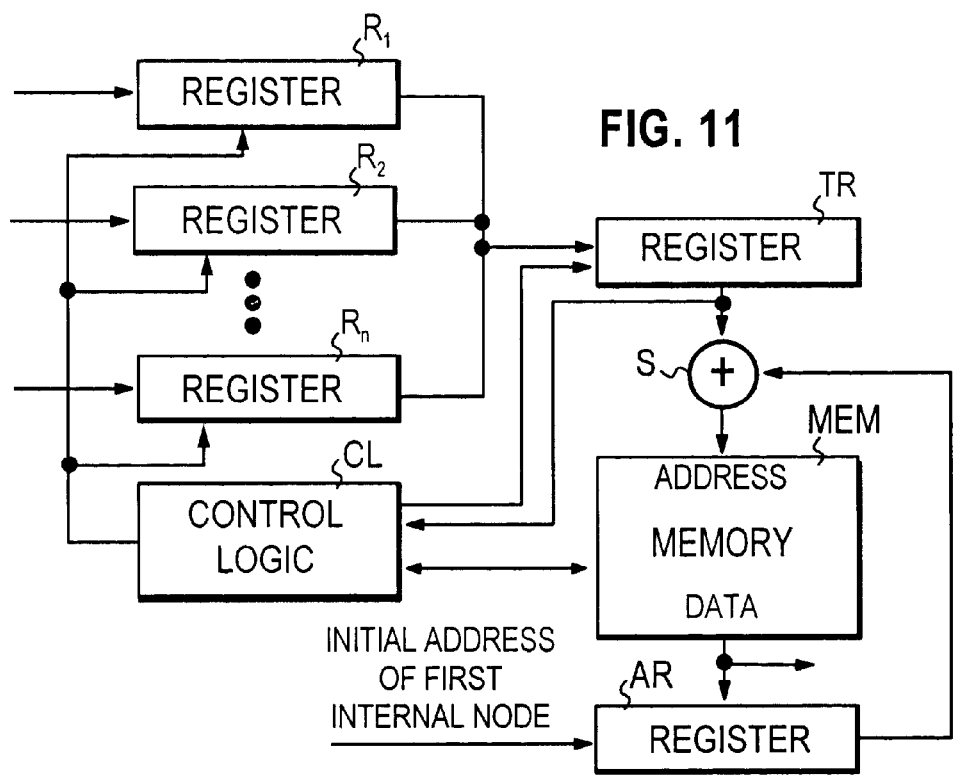
FIG. 11

FUNCTIONAL MEMORY BASED ON A TRIE STRUCTURE

This application is a continuation of international application serial number PCT/FI00380, filed Apr. 28, 2000 verified.

FIELD OF THE INVENTION

The present invention generally relates to implementation of a memory. More specifically, the invention is intended to be used in connection with all such memories that are based on a functional digital trie structure. The solution is, however, mainly intended for central memory databases. A functional structure denotes a memory in which updates, such as additions, are made in such a way that the path from the root to the point of addition is first copied, and the addition is made to the copied data (the addition is not made directly to the existing data). Such an updating procedure is also called by the term "copy-on-write".

BACKGROUND OF THE INVENTION

The prior art unidimensional directory structure termed digital trie (the word "trie" is derived from the English word "retrieval") is the underlying basis of the principle of the present invention. Digital trie structures can be implemented in two types: bucket tries, and tries having no buckets.

A bucket digital trie structure is a tree-shaped structure composed of two types of nodes: buckets and trie nodes. A bucket is a data structure that can accommodate a number of data units or a number of pointers to data units or a number of search key/data unit pairs or a number of search key/pointer pairs. A maximum size greater than one has been defined for said number. However, a bucket can contain a smaller number than said maximum number of data units, pointers, or key/pointer pairs, in which case the bucket is not full. A trie node, on the other hand, is an array guiding the retrieval, having a size of two by the power of k ($2^k$) elements. If an element in a trie node is in use, it refers either to a trie node at the next level in the directory tree or to a bucket. In other cases, the element is free (empty).

Search in the database proceeds by examining the search key (which in the case of a subscriber database in a mobile telephone network or a telephone exchange, for instance, is typically the binary numeral corresponding to the telephone number of the subscriber) k bits at a time. The bits to be searched are selected in such a way that at the root level of the structure (in the first trie node), k leftmost bits are searched; at the second level of the structure, k bits next to the leftmost bits are searched, etc. The bits to be searched are interpreted as an unsigned binary integer that is employed directly to index the element table contained in the trie node, the index indicating a given element in the table. If the element indicated by the index is free, the search will terminate as unsuccessful. If the element refers to a trie node at the next level, k next bits extracted from the search key are searched at that level in the manner described above. As a result of comparison, the routine branches off in the trie node either to a trie node at the next level or to a bucket. If the element refers to a bucket containing a key, the key stored therein is compared with the search key. The entire search key is thus compared only after the search has encountered a bucket. Where the keys are equal, the search is successful, and the desired data unit is obtained at the storage address indicated by the pointer of the bucket. Where the keys differ, the search terminates as unsuccessful.

A bucketless trie structure has no buckets, but a leaf node containing only one element that can be a data unit, a pointer to a data unit, a search key/data unit pair or a search key/pointer pair corresponds to a bucket. In the present context, the nodes above the leaf nodes in the bucketless trie structure are called internal nodes; these correspond to trie nodes in a bucket structure (i.e., they comprise a similar table as trie nodes). In a bucketless digital trie structure, the nodes are thus either internal nodes or leaf nodes. By means of buckets, the need for reorganizing the directory structure can be postponed, as a large number of pointers, data units, search key/data unit pairs or search key/pointer pairs can be accommodated in the buckets until a time when such a need arises.

FIG. 1 shows an example of a digital trie structure in which the key has a length of 4 bits and k=2, and thus each trie node has $2^2$=4 elements, and two bits extracted from the key are searched at each level. Leaves are denoted with references A, B, C, D . . . H . . . M, N, O and P. Thus a leaf is a node that does not point to a lower level in the tree. Internal nodes are denoted with references IN1 . . . IN5 and elements in the internal node with reference NE in FIG. 1.

In the exemplary case of FIG. 1, the search keys for the leaves shown are as follows: A=0000, B=0001, C=0010, . . . , H=0111, . . . and P=1111. In this case, a pointer is stored in each leaf to that storage location in the database SD at which the actual data, e.g. the telephone number of the pertinent subscriber and other information relating to that subscriber, is to be found. The actual subscriber data may be stored in the database for instance as a sequential file of the type shown in the figure. The search is performed on the basis of the search key of record H, for example, by first extracting from the search key the two leftmost bits (01) and interpreting them, which delivers the second element of node IN1, containing a pointer to node IN3 at the next level. At this level, the two next bits (11) are extracted from the search key, thus yielding the fourth element of that node, pointing to record H.

Instead of a pointer, a leaf may contain (besides a search key) an actual data file (also called by the more generic term data unit). Thus for example the data relating to subscriber A (FIG. 1) may be located in leaf A, the data relating to subscriber B in leaf B, etc.

The present invention mainly relates to bucketless trie structures, since the solution in accordance with the invention affords the same advantages as a bucket structure, and thus the invention yields greater benefit in bucketless structures. These facts will be described in detail hereinafter.

The search key may also be multidimensional. In other words, the search key may comprise a number of attributes (for example the family name and one or more forenames of a subscriber). Such a multidimensional trie structure is disclosed in international application No. PCT/FI95/00319 (published under number WO 95/34155). In said structure, address computation is performed in such a way that a given predetermined number of bits at a time is selected from each dimension independently of the other dimensions. Hence, a fixed limit independent of the other dimensions is set for each dimension in any individual node of the trie structure, by predetermining the number of search key bits to be searched in each dimension. With such a structure, the memory circuit requirement can be curbed when the distribution of the values of the search keys is known in advance, in which case the structure can be implemented in a static form.

If the possibility of reorganizing the structure in accordance with the current key distribution to be optimal in terms of efficiency and storage space occupancy is desired, the size of the nodes must vary dynamically as the key distribution changes. When the key distribution is even, the node size may be increased to make the structure flatter (a flatter structure entails faster retrievals). On the other hand, with uneven key distributions in connection with which storage space occupancy will present a problem in memory structures employing dynamic node size, the node size can be maintained small, which will enable locally a more even key distribution and thereby smaller storage space occupancy. Dynamic changes of node size require the address computation to be implemented in such a way that in each node of the tree-shaped hierarchy constituted by the digital trie structure, a node-specific number of bits is selected from the bit string constituted by the search keys used. Dynamic reorganizing of the nodes naturally requires part of the processing capacity.

The choice between a fixed node size and a dynamically changing node size is dependent for example on what type of application the memory is intended for, e.g. what the number of database searches, additions and deletions is and what the proportions of said operations are.

The efficiency and performance of the memory are thus influenced, among other things, by the storage space required by the trie structure and the depth of the trie structure. In a functional digital trie structure, in which the entire search path from the root to the point of updating has to be copied in connection with updates, the performance of the memory is also influenced by how many words to be copied such a path contains. Thus, if compression is performed in the memory, this should be done in such a way that the quantity of data to be copied does not increase as a result of compression to such an extent as to impair the performance of the memory.

U.S. Pat. No. 5,276,868 discloses a compression method for a trie node. This system supports only two node sizes: quads and nodes of size 16. In the method, some of the nil pointers are removed from the nodes in such a way that nodes having less than five non-nil pointers are converted to compressed quads, whereas the remaining nodes are maintained uncompressed. The structure thus includes both compressed nodes and non-compressed nodes of size 16. Since nil pointers must still be stored in the structure, the structure does not provide a very good result in view of storage space requirement and copying costs. Also, since only two node sizes are possible, the structure is not well suited to functional memories or other memories having efficient memory management that is capable of allocating memory for use a single word at a time.

Hence, the problem with a functional trie structure is how compression should be carried out in the structure in order for the memory performance to be as good as possible, observing all the above factors.

SUMMARY OF THE INVENTION

It is an object of the present invention to provide a solution to the problem described above. This object is achieved with the method defined in the independent claims.

The invention makes use of the prior art width compression, to which reference is made e.g. in the above U.S. Patent. For this reason, the node size for the trie tree is already initially selected to be as large as possible: the logical size of the nodes used in the structure is preferably 16, but can in principle be even greater. In accordance with the invention, increasing the width-compressed node is permitted up to a maximum limit, which is smaller than the maximum size of the node. The node is split into a cluster of nodes as soon as it grows to be in excess of this threshold value. In the case of a width-compressed node having 16 elements, for example, it is preferred to employ 13 child nodes as the threshold value. If the number of child nodes exceeds 13, the parent node is disassembled into a cluster of compressed quad nodes.

The idea in accordance with the invention is based on the insight that as the size of a width-compressed node increases, the copying costs increase sharply at some stage, since the copying carried out in connection with updates always takes place from the root of the tree up to the point of update and since the nodes in the upper part of the tree, which are copied at every copying round, are filled first and are normally fuller than the lower nodes. Hence, increasing the fill rate of a width-compressed node is of no avail when a certain stage has been reached, but the increase in copying costs totally eliminates the advantage to be gained with width compression. In accordance with the invention, at this stage at the latest the width-compressed node is converted back to a cluster of nodes at two different hierarchy levels.

The idea is also to avoid such a sharp increase in copying costs, so that the cluster of nodes to be formed is as advantageous as possible in view of the requirements set out above. For example, the threshold value 13 stated above is advantageous for nodes of size 16 in the sense that the copying costs cannot increase sharply yet, and on the other hand, when the size is greater than 13, one can be certain that when a cluster of quad nodes is formed, the parent node will contain no nil pointers. Hence, the search operation can be accelerated, since the number of pointers in said node need not be examined in connection with the search. Furthermore, one can be certain that in the node cluster to be formed, none of the child nodes in the cluster will be path-compressed (it is preferable to use path compression in the structure), since in this case the parent node is full and each child node has at least two child nodes (the path compression to be carried out in the quad cluster will retard the calculation).

In order for the memory performance to remain optimum the entire time, it is preferable to reassemble the cluster of nodes into a width-compressed node when the number of the grandchild nodes of the parent node of the cluster falls to said threshold value or below it.

When the solution in accordance with the invention is used, the memory consumption of the functional structure can be diminished by means of width compression without the number of words to be copied in connection with updates substantially increasing and thereby diminishing the advantage to be gained by width compression.

BRIEF DESCRIPTION OF THE DRAWINGS

In the following the invention and its preferred embodiments will be described in closer detail with reference to examples in accordance with FIGS. 2–11 in the accompanying drawings, in which FIG. 7 illustrates the storage space requirement of a trie tree as a function of the upper limit of non-nil pointers in the node, FIGS. 8 and 9 illustrate the change of a quad cluster back to a width-compressed node of logical size 16, FIG. 10 illustrates the structure of a width-compressed node, and FIG. 11 shows a memory arrangement in accordance with the invention on block diagram level.

DETAILED DESCRIPTION OF THE INVENTION

Figure 1:
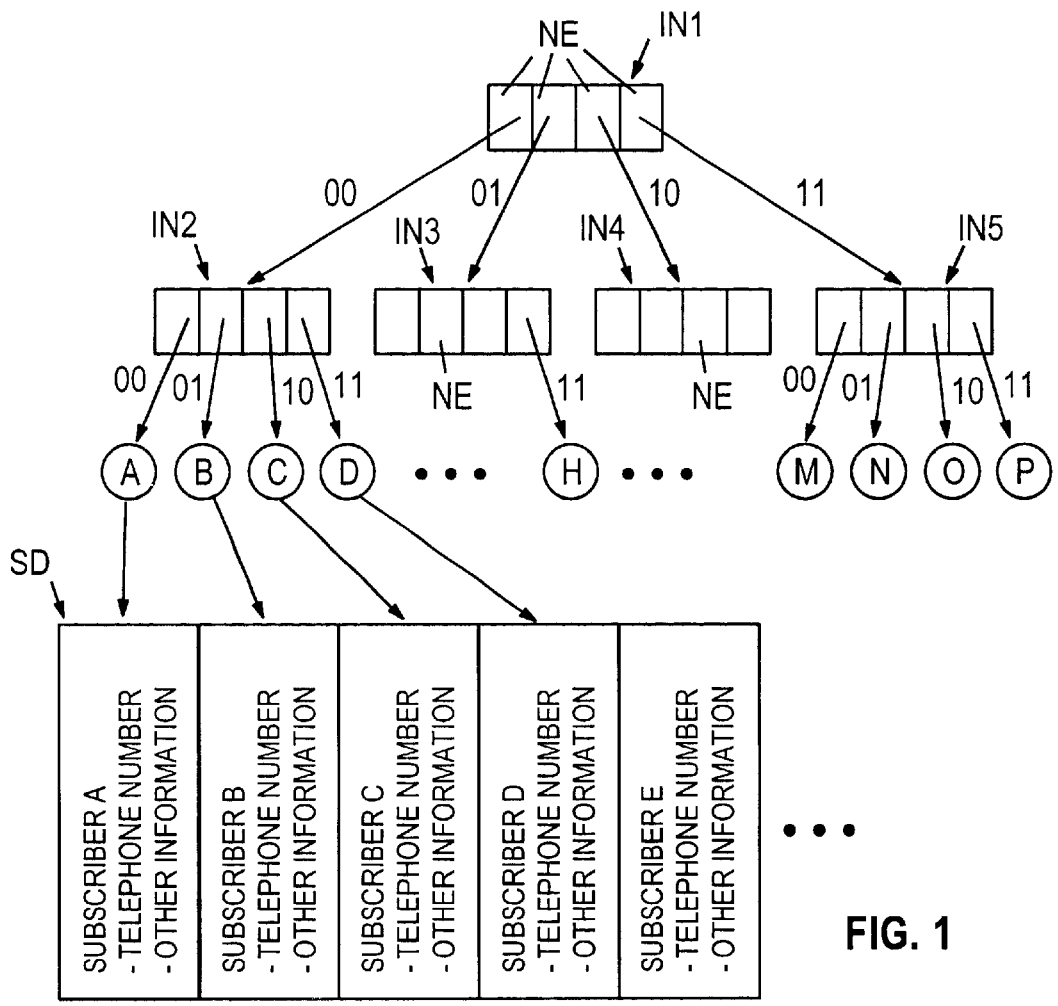
FIG. 1 illustrates the use of a unidimensional digital trie structure in the maintenance of subscriber data in a telephone exchange.
Figure 2:
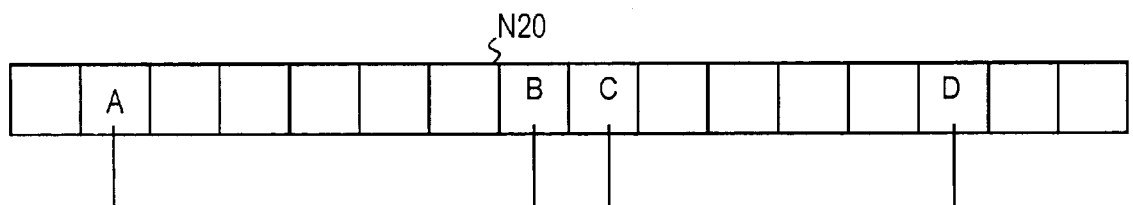
FIG. 2 shows a node of size 16, having four non-nil pointers.

When width compression is used on the nodes of a functional trie structure, it can be effectively utilized by selecting a large node size for the structure. Thus, in the structure in accordance with the invention the starting-point is a node size distinctly larger than quads, preferably nodes of (logical) size 16. FIG. 2 illustrates such a node N20, which in this exemplary case has four non-nil pointers pointing downward in the tree. Prior art width compression is carried out on the nodes of the structure by storing only those pointers that differ from nil. In addition to the non-nil pointers, a bit pattern or chart BP1 is stored in connection with the node, on the basis of which it can be determined whether the pointer corresponding to the logical index of the element table of the node is a nil pointer or not, and if not, where the pointer corresponding to said logical index is physically located in the node. When compression is used, the standard-length element table (16 elements) of the node is represented by means of the bit pattern as a table of physical storage locations the length of which varies according to how many nil pointers the node contains in each case. It is to be noted, therefore, that in connection with width compression the logical size of the node (i.e. the size of the element table) does not change, but the physical size of the node diminishes instead, since in a compressed node the nil pointers do not occupy any storage space. As a result, a width-compressed node N30 in accordance with FIG. 3, in which all non-nil pointers are in succession, is obtained from the node of FIG. 2. The node contains only four physical elements (pointers A . . . D), and in addition a bit pattern BP1 is stored in the node, indicating the physical location of the pointer therein corresponding to the element table index formed from the search key. In this exemplary case, the bit pattern has one bit for each element (logical index) of the element table, and each bit indicates whether the corresponding element contains a non-nil pointer or a nil pointer. In the exemplary case shown in the figure, one denotes a non-nil pointer and zero denotes a nil pointer. Since the pointers are stored in the compressed node preserving the order (and no space is reserved for nil pointers), it is known for the compressed node of FIG. 3 that a nil pointer corresponds to element table index 0, a non-nil pointer corresponds to element table index 1, its physical index being zero, nil pointers correspond to element table indices 2 . . . 6, non-nil pointers correspond to element table indices 7 and 8, their physical indices being one and two, nil pointers correspond to element table indices 9 . . . 12, a non-nil pointer corresponds to element table index 13, its physical index being three, and nil pointers correspond to element table indices 14 and 15. Thus, the pointer corresponding to the logical index formed from the search key bits is found in the node. Such a method of compression, in which the bit pattern of the compressed node has one bit for each element (logical index) of the element table, is known per se. Such a solution is referred to for example in the above U.S. Pat. No. 5,276,868.

Figure 3:
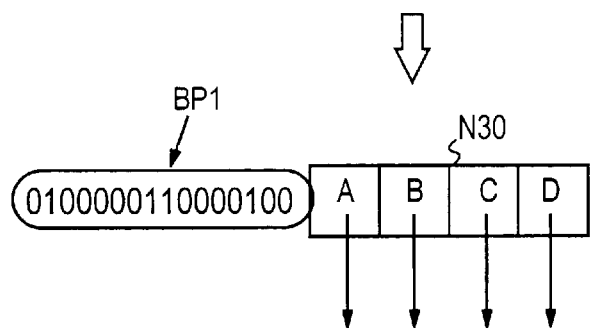
FIG. 3 shows the node of FIG. 2 width-compressed.

Address computation for the compressed node is performed in such a way that a (logical) element table index is first formed from the bits extracted from the search key in the normal way. Thereafter, the bit corresponding to this index is read from the bit pattern. If the bit indicates that a nil pointer is concerned, the search is terminated as unsuccessful. If the bit indicates that a non-nil pointer is concerned, the physical location (physical index) of the pointer corresponding to said element table index is determined by means of the bit pattern. When a bit pattern of the kind shown in FIG. 3 is employed, having one bit for each index of the element table, the physical index is directly obtained by counting the number of 1-bits starting from the beginning of the bit pattern up to the bit corresponding to the element table index.

Another alternative is to continue the search without checking whether the bit in the bit pattern corresponding to the logical index is zero or not, that is, the physical index can be retrieved without performing said check. In this case, the search is continued up to a leaf, in which a key comparison is performed. Failure of the search is detected on the basis of said comparison in the leaf.

However, the number of bits used in the bit pattern can deviate from the number of logical indices, and the bit pattern can employ various coding methods by means of which the physical storage location corresponding to the logical index is found. Yet the above-stated solution enables a short bit pattern and a simple coding mechanism.

As was stated previously, the solution in accordance with the invention is based on the insight that when the size of a width-compressed node increases, the copying costs will at some stage increase so sharply that increasing the fill rate of the node is of no avail, but the increase in copying costs totally eliminates the advantage to be gained with increased width compression. When additions are made in the trie tree, the compressed nodes increase in size. In accordance with the invention, the width-compressed nodes are not permitted to be filled, but an upper limit is set on their size (number of physical elements, i.e. non-nil pointers), whereafter they are disassembled into node clusters. This limit is preferably 13 with a node of size 16, since additional advantages are gained with the use of this limit.

Figure 4:
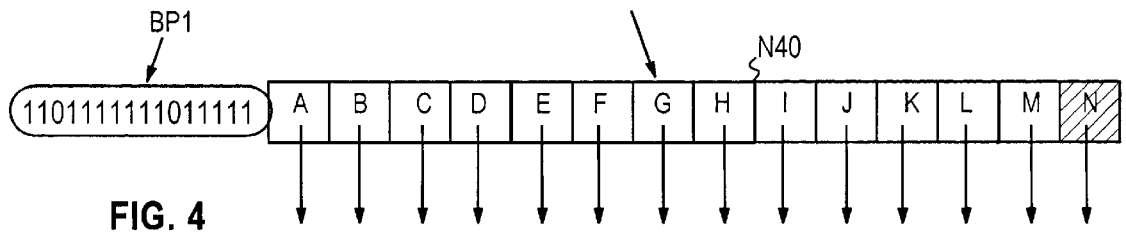
FIG. 4 shows a situation in which the size of the width-compressed node has become too large on account of an addition made to the node.

The procedure in accordance with the invention will be described in the following with reference to the example in accordance with FIGS. 4 and 5. When additions are made to the width-compressed node in accordance with FIG. 3, the size of the node increases. At some stage, the node contains 13 pointers, which is the maximum number of child nodes for a width-compressed node in the structure in accordance with the invention (when nodes of size 16 are used). When a fourteenth pointer (N, FIG. 4) is added to such a node (node N40, FIG. 4), the width-compressed node is disassembled into a cluster of compressed quad nodes in accordance with FIG. 5, having a parent node N50 and four child nodes (N51 . . . N54) with a total of 14 pointers to grandchild nodes. Each of the quad nodes in the cluster is similarly width-compressed as the original node of size 16, and thus each quad node has a bit pattern of four bits, each bit indicating whether the corresponding element has a nil pointer or a non-nil pointer.

Hence, the trie structure in accordance with the invention is preferably one having width-compressed nodes only. The nodes are otherwise of logical size 16, but each node in which the maximum fill rate has been exceeded has been converted to a cluster of width-compressed quads.

By means of the disclosed procedure, the adverse effect of copying costs can be avoided in a highly advantageous way. This is due firstly to the fact that by selecting the value 13 as the maximum number of child nodes of a width-compressed node, one can be certain that the parent node (N50) to be formed is always full. Therefore, the number of pointers for said node need not be examined, and thus the retrieval process is rapid in this respect. On the other hand, one can be certain that even though the structure employs path compression, in the quad cluster to be formed none of the child nodes of the cluster will be path-compressed, since in this case each child node has at least two child nodes of its own (path compression to be carried out in a quad cluster will retard the computation).

Figure 6:
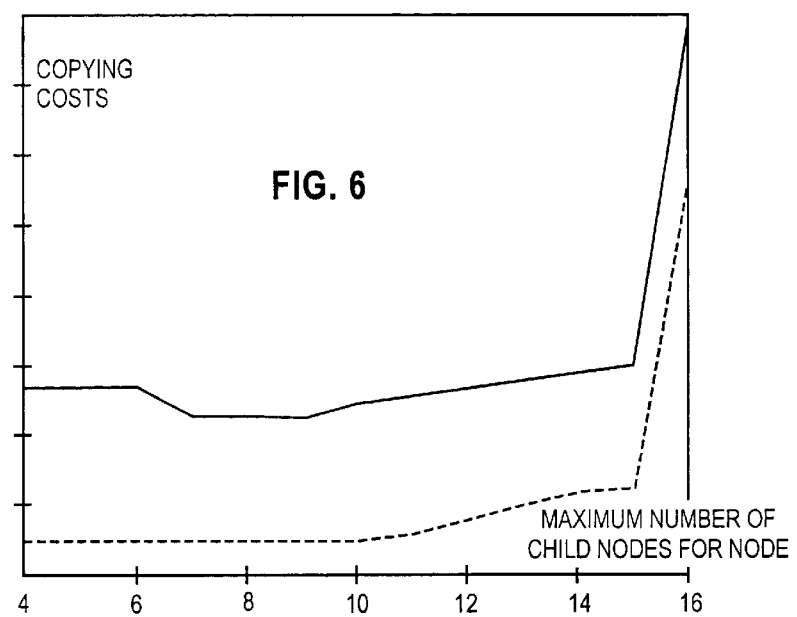
FIG. 6 illustrates the increase of copying costs in a functional trie structure as a function of the upper limit of non-nil pointers in the node.

In addition to the advantages set out above, the value 13 offers a good compromise between copying costs and storage space requirement. This fact has been studied by experimentally measuring copying costs and trie tree storage space requirement in a trie tree in which the nodes are of size 16 and are width-compressed in the manner described above. An even key distribution has been employed in the test. FIG. 6 depicts the copying cost (number of words to be copied) as a function of the maximum number of child nodes of the width-compressed node. The maximum copying cost has been shown by a continuous line and the average copying cost by a broken line. As will be seen from the figure, the copying costs will increase sharply if filled nodes are permitted in the structure. FIG. 7 shows correspondingly the space occupancy (memory requirement) of a trie tree as a function of the maximum number of child nodes of the width-compressed node. As is apparent, the space occupancy will decrease in so far as fuller nodes are permitted. It is also to be seen from the figures that proceeding in accordance with the invention will afford a good compromise between space occupancy and copying costs.

Figure 5:
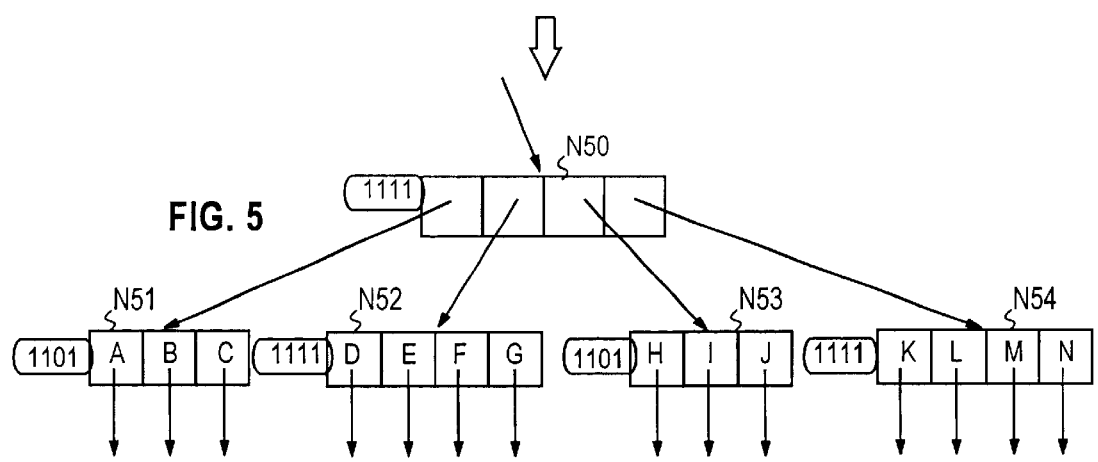
FIG. 5 shows a quad node cluster disassembled from the node of FIG. 4.

When deletions are made in the quad cluster in accordance with FIG. 5 so that the number of grandchild nodes becomes less than 14, the cluster is reconverted to a single width-compressed node. This is illustrated in FIGS. 8 and 9. When one pointer, e.g. pointer K, is deleted from the child nodes in the cluster of FIG. 5, a cluster of the kind shown in FIG. 8 is obtained, where the number of grandchild nodes has decreased to 13. As a result, a level compression by means of which the cluster is restored to a single width-compressed node is carried out. This will give the node N90 shown in FIG. 9.

In addition to the type information of the node, each node must contain only an element table (pointers) and a bit pattern.

FIG. 10 illustrates the structure of a width-compressed node. In its minimum composition, the compressed node thus comprises three parts: a type information field indicating the type of the node (reference 111), field 112 containing a bit pattern, and an element table (reference 113) in which the number of elements (pointers) is in accordance with the above. In addition to the node types stated above, the type information is used to indicate whether the node is a leaf node. The bit pattern and the node type information can in practice be accommodated in the same word, and thus the bit pattern requires no extra space.

As was indicated at the beginning, the principle described above mainly pertains to a bucketless trie structure. This is due to the fact that the solution in accordance with the invention will as such afford the same advantages as buckets do (compact structure at the lower end of the tree as well), and thus it is preferable to use similar nodes in the entire tree. The leaf nodes typically contain a pointer to a data unit (or a data unit). However, the use of buckets is not ruled out.

It is advantageous to incorporate into the memory in accordance with the invention also path compression to which brief reference was made above, since single-child nodes will be produced in the structure in spite of the compression described above. Path compression means that paths containing successive single-child nodes are compressed in depth. Since path compression can be implemented in known manner, it will not be described more closely in this context. One kind of path compression is disclosed in the Applicants' earlier patent application PCT/FI98/00191.

A unidimensional directory structure can be made multidimensional (generally n-dimensional) in the known manner by employing bit interleaving. Bit interleaving has been disclosed for example in the above international application PCT/FI98/00191, wherefrom the interested reader can find background information relating to the invention, if so desired.

As will be noted from the above, in the functional structure in accordance with the invention the starting-point is level compression that is cancelled when the fill rate of the level-compressed node reaches a given limit (that is, when the copying costs become inordinate). In conventional imperative structures, on the other hand, the starting-point is the smallest possible node size and the node size is increased (i.e., level compression is performed) when there are a sufficient number of internal nodes among the child nodes for the node.

FIG. 11 shows a memory in accordance with the invention on block diagram level. Each dimension has a dedicated input register, and hence there is a total of n input registers. The search key of each dimension is stored in these input registers, denoted by references $R_1 \ldots R_n$, each key in a register of its own. The input registers are connected to a register TR in which the above-described search word is formed in accordance with the bit interleaving method employed. The register TR is connected via adder S to the address input of memory MEM. The output of the memory in turn is connected to address register AR the output of which in turn is connected to adder S. Initially the bits selected from each register are read into the common register TR in the correct order. The initial address of the first internal or trie node is first stored in the address register AR, and the address obtained as an offset address from register TR is added to the initial address in adder S. The resulting address is supplied to the address input of the memory MEM, and the data output of the memory provides the initial address of the next node, the address being written into the address register AR over the previous address stored therein. Thereafter the next selected bits are again loaded from the input registers into the common register TR in the correct order, and the address (index) obtained thereby is added to the initial address of the relevant table (i.e., trie node), obtained from the address register AR. This address is again supplied to the address input of the memory MEM, the data output of the memory thus providing the initial address of the next node. The above-described procedure is repeated until the desired point has been accessed and recordal can be performed or the desired record read.

Control logic CL reads the element table index from register TR and the corresponding bit from the bit pattern of the node. If said bit indicates that a non-nil pointer is concerned, the control logic determines the physical index on the basis of the bit pattern and stores it in register TR instead of the logical index. In such a case, the physical index is added (instead of the logical index) in adder S with the initial address of the node that is obtained from register AR. The control logic also attends to the compression of the nodes and to the fact that a correct number of bits (2 or 4) is extracted from the registers in each node.

The rapidity of the address computation can be influenced by the type of hardware configuration chosen. Since progress is by way of the above-stated bit manipulations, address computation can be accelerated by shifting from use of one processor to a multiprocessor environment in which parallel processing is carried out. An alternative implementation to the multiprocessor environment is an ASIC circuit.

The structure in accordance with the invention is preferably implemented in such a manner that also the nodes (which are preferably leaves) at the lowermost level are compressed similarly as the other nodes (internal nodes). If a pointer is stored in a leaf, the structure of the leaves is the same as in the internal nodes. If data units are stored in the leaves, these can be of fixed length in order that also the leaves can be compressed similarly as the internal nodes. However, it is possible that the nodes at the lowermost level are not similarly width-compressed. In that case, however, some of the advantages of the invention are lost, since in that case the search is slower at the leaves, Even though the invention has been described in the above with reference to examples in accordance with the accompanying drawings, it is obvious that the invention is not to be so restricted, but it can be modified within the scope of the inventive idea disclosed in the appended claims. Although the invention has been described with reference to a preferred node size, the same principle can be applied also to nodes having a logical size greater than 16, e.g. 32 or 64. In such a case, the nodes in the cluster to be constructed from the node are also respectively larger than quad nodes. A leaf node typically contains a pointer to a stored data unit, but it can also contain a data unit or a pointer to a node in another directory structure.

What is claimed is:

1. A memory arrangement for storing data units, said memory arrangement comprising a directory structure in which progress is made by using search words formed from a bit string constituted by the search keys employed in each case, said directory structure comprising a tree-shaped hierarchy having nodes at several different hierarchy levels, wherein at least some of the nodes are such that the node is associated with a logical table wherein an individual element may contain a pointer pointing to a lower node in the tree-shaped hierarchy and wherein an individual element may also be empty, in which case the content of the element corresponds to a nil pointer, the number of elements in the table corresponding to a power of two, at least some of the nodes in said directory structure being width-compressed nodes in which only non-nil pointers are physically stored and additionally a bit pattern (BP1) on the basis of which the physical storage location in the node, corresponding to the search word, can be determined, wherein
a first part of the nodes are such in which the number of pointers stored in the node is always smaller than or equal to a given predetermined threshold value that is smaller than the number of elements in the table of the node, and a second part of the nodes is constituted by clusters of nodes, each consisting of a parent node and its child nodes at a lower hierarchy level, the number of the grandchild nodes of said parent node always exceeding said threshold value.

2. A memory arrangement as claimed in claim 1, wherein at least the nodes in the first part are width-compressed nodes.

3. A memory arrangement as claimed in claim 1, wherein the nodes in both the first part and the second part are width-compressed.

4. A memory arrangement as claimed in claim 1, wherein substantially all nodes in the directory structure are width-compressed nodes.

5. A method for implementing a functional memory, in which memory data is stored as data units for each of which a dedicated storage space is assigned in the memory, in accordance with which method the memory is implemented as a directory structure comprising a tree-shaped hierarchy having nodes at several different levels, wherein at least some of the nodes are such that the node is associated with a logical table wherein an individual element may contain a pointer pointing to a lower node in the tree-shaped hierarchy and wherein an individual element may also be empty, in which case the content of the element corresponds to a nil pointer, the number of elements in the table corresponding to a power of two, address computation performed in the directory structure comprises the steps of
(a) in the node at the uppermost level of the tree-shaped hierarchy, selecting a given number of bits from the bit string formed by the search keys employed, forming from the selected bits a search word with which the address of the next node is sought in the node, and proceeding to said node,
(b) selecting a predetermined number of bits from the unselected bits in the bit string formed by the search keys employed and forming from the selected bits a search word with which the address of a further new node at a lower level is sought in the node that has been accessed,
repeating step (b) until an element containing a nil pointer is encountered or until a node at the lowermost level has been accessed, when a data unit is added to the structure, pointers by means of which the data unit can be retrieved by means of said address computation are added to the nodes, in the directory structure, pointers are first added to nodes whose table contains a given first number of elements and which are width-compressed nodes in which non-nil pointers are physically stored and additionally a bit pattern on the basis of which the physical storage location in the node, corresponding to the search word, can be determined, wherein
addition of a pointer to an individual width-compressed node is permitted until the number of pointers in the node corresponds to a given predetermined threshold value that is smaller than said first number, and
the width-compressed node is converted to a cluster of nodes made up by a parent node and separate child nodes as soon as the number of pointers to be accommodated in the width-compressed node exceeds said threshold value.

6. A method as claimed in claim 5, wherein the first number is sixteen, wherein addition of a pointer to a width-compressed node is permitted each time the number of pointers in the node after the addition is smaller than or equal to thirteen, and that the width-compressed node is converted to a cluster of width-compressed quad nodes each time the number of pointers to be accommodated in the width-compressed node exceeds the value thirteen.

7. A method as claimed in claim 5, wherein width-compressed nodes are made from all nodes of the structure.

8. A method as claimed in claim 5, wherein the cluster of nodes made up by said parent node and its child nodes is reconverted to a single width-compressed node as soon as the number of the grandchild nodes of the parent node decreases to said threshold value or below it.

9. A method as claimed in claim 5, wherein the non-nil pointers are stored in the width-compressed node in succession in the same order as they have in said table.

10. A method as claimed in claim 9, wherein the bit pattern comprises one bit for each element in the table, each bit indicating whether the corresponding element has a nil pointer or a non-nil pointer.

\* \* \* \* \*